United States Patent
Hu

(10) Patent No.: US 11,966,734 B2
(45) Date of Patent: Apr. 23, 2024

(54) METHOD FOR DEVELOPING ANDROID TV HYBRID APPLICATION

(71) Applicant: REALTEK SEMICONDUCTOR CORPORATION, Hsinchu (TW)

(72) Inventor: Ya-Ting Hu, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 116 days.

(21) Appl. No.: 17/897,411

(22) Filed: Aug. 29, 2022

(65) Prior Publication Data

US 2023/0084933 A1   Mar. 16, 2023

(30) Foreign Application Priority Data

Sep. 10, 2021   (CN) .......................... 202111065683.5

(51) Int. Cl.
  *G06F 8/76*   (2018.01)
  *G06F 8/20*   (2018.01)

(52) U.S. Cl.
  CPC . *G06F 8/76* (2013.01); *G06F 8/20* (2013.01)

(58) Field of Classification Search
  None
  See application file for complete search history.

(56) References Cited

U.S. PATENT DOCUMENTS

| | | | | |
|---|---|---|---|---|
| 8,887,178 B1 * | 11/2014 | Browne | ................... | G06F 9/541 719/319 |
| 2013/0174154 A1 * | 7/2013 | Poore | ...................... | G06F 9/546 718/1 |
| 2016/0378462 A1 * | 12/2016 | Hu | ......................... | H04L 67/34 717/173 |

FOREIGN PATENT DOCUMENTS

CN   104636139 A   5/2015

OTHER PUBLICATIONS

IWedia, "SW Architecture Specification Project: Android4TV", May 20, 2014, last retrieved from https://android4tv.iwedia.com/documents/Android4TV%20-%20SW%20Architecture%20v1.5.pdf on Feb. 8, 2024. (Year: 2014).*

M. Milosevic, N. Teslic, M. Pejovic, M. Radonjic and B. Mlikota, "Android framework for web-based digital TV applications: A proposal and analyses," 2015 IEEE 5th International Conference on Consumer Electronics—Berlin (ICCE—Berlin), Berlin, Germany, 2015, pp. 32-34. (Year: 2015).*

(Continued)

*Primary Examiner* — Andrew M. Lyons
(74) *Attorney, Agent, or Firm* — WPAT, PC

(57) ABSTRACT

A method for developing an Android TV hybrid application includes: generating a WebView component in an Android Activity belonging to an Android side of the application; obtaining a WebSettings subclass and using it to configure the WebView component; using Web technologies to develop a Web page belonging to a Web side of the application; using the WebView component to show the Web page; creating a first Java object blended with a JavaScript context in the Android side to define different interfaces, and creating a second Java object to implement the interfaces defined by the first Java object, so that the Web side can call the functions of the Android side; providing a packaged Java class in the Android side to send messages, and providing a packaged JavaScript module in the Web side to process the messages, so that the Android side can feedback the messages to the Web side.

9 Claims, 5 Drawing Sheets

(56) References Cited

OTHER PUBLICATIONS

Stackoverflow, "Understanding Android's webview addjavascriptinterface", answer by okonomichiyaki on Jul. 20, 2012, last retrieved from https://stackoverflow.com/questions/10962150/understanding-androids-webview-addjavascriptinterface on Feb. 8, 2024. (Year: 2012).*
A. Tiwari, J. Prakash, S. Groß and C. Hammer, "LU Droid: A Large Scale Analysis of Android—Web Hybridization," 2019 19th International Working Conference on Source Code Analysis and Manipulation (SCAM), Cleveland, OH, USA, 2019, pp. 256-267, doi: 10.1109/SCAM.2019.00036. (Year: 2019).*
OA letter of a counterpart TW application (appl. No. 110139121) dated Jul. 15, 2022. Summary of the TW OA letter in regard to the TW counterpart application: Claim 1 does not include inventive features. Claims 1-4 are rejected as being unpatentable over in view of the common techniques.

\* cited by examiner

METHOD FOR DEVELOPING ANDROID TV HYBRID APPLICATION

BACKGROUND OF THE INVENTION

1. Field of the Invention

The present disclosure relates to a method for developing an application, especially to a method for developing an Android television (TV) hybrid application.

2. Description of Related Art

As Android televisions (TVs) become popular worldwide, the developments of Android TV applications are in great demand.

The main designs of an application (App) involve a user interface (UI) and business logic. A UI of an App brings intuitive impressions to users; if the UI is not good, the users won't be attracted to the App regardless of how good the business logic is, and this is because the users pay much attention to visual effects; and if the business logic is not good, the APP will bring bad experience to the users in the long term, and will not retain the users.

A conventional Android TV App is a native App. A native App is usually composed with a programming language (e.g., Java) and has the advantages of good user experience and stable performance; however, the native App is hard to be developed and updated and thus has the disadvantages of a high development cost, a long development cycle, and a high maintenance cost. Although a native App may be replaced with a Web App which can be developed in a low cost and updated easily, the Web App is of limited design and performance, and this leads to bad user experience.

SUMMARY OF THE INVENTION

An object of the present disclosure is to provide a method for developing an Android television (TV) hybrid application (APP) having the advantages of both a native App and a Web App.

An embodiment of the present method for developing an Android TV hybrid application includes the following steps: generating an Android WebView component in an Android Activity, wherein the Android Activity belongs to an Android side of the Android TV hybrid application; obtaining a WebSettings subclass and using the WebSettings subclass to configure the Android WebView component; using Web technologies to develop a Web page of the Android TV hybrid application, wherein the Web page belongs to a Web side of the Android TV hybrid application; using the Android WebView component to load the Web page and display the Web page; creating a first Java object in the Android side to define at least one interface between the Android side and the Web side and creating a second Java object in the Android side to implement the at least one interface defined by the first Java object, and thereby allowing the Web side to call functions in the Android side through the first Java object and the second Java object; and embedding a packaged Java class in the Android side to send messages to the Web side and embedding a packaged JavaScript module in the Web side to handle the messages, and thereby allowing the Android side to feedback the messages to the Web side through the packaged Java class and the packaged JavaScript module, wherein the packaged JavaScript module's main duty is maintaining a listener list.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

A conventional Android television (TV) application (App) is a native App. Although a native App has the advantages of good user experience and stable performance, it is hard to be developed and updated. A native App can be replaced with a Web App which can be developed in a low cost and updated easily, but the Web App is of limited design and performance and thus has the disadvantage of bad user experience. The present specification discloses a method for developing an Android TV hybrid App to take the advantages of both the native App and the Web App into consideration.

The method of the present disclosure (hereinafter referred to as "the present method") for developing an Android TV hybrid App uses Web technologies characterized by a low cost and low difficulty to realize the complicated development of a user interface (UI) and the appearance thereof, and therefore greatly reduces the whole difficulty of developing an Android TV App; in addition, the present method realizes the business logic of the Android TV App and the provision of data sources for the Android TV App in an Android native system side to ensure good user experience. Furthermore, the present method embeds code packages into an Android side and a Web side of the Android TV App respectively to simplify the maintenance and the extension of the Android TV App's functions.

Figure 1:
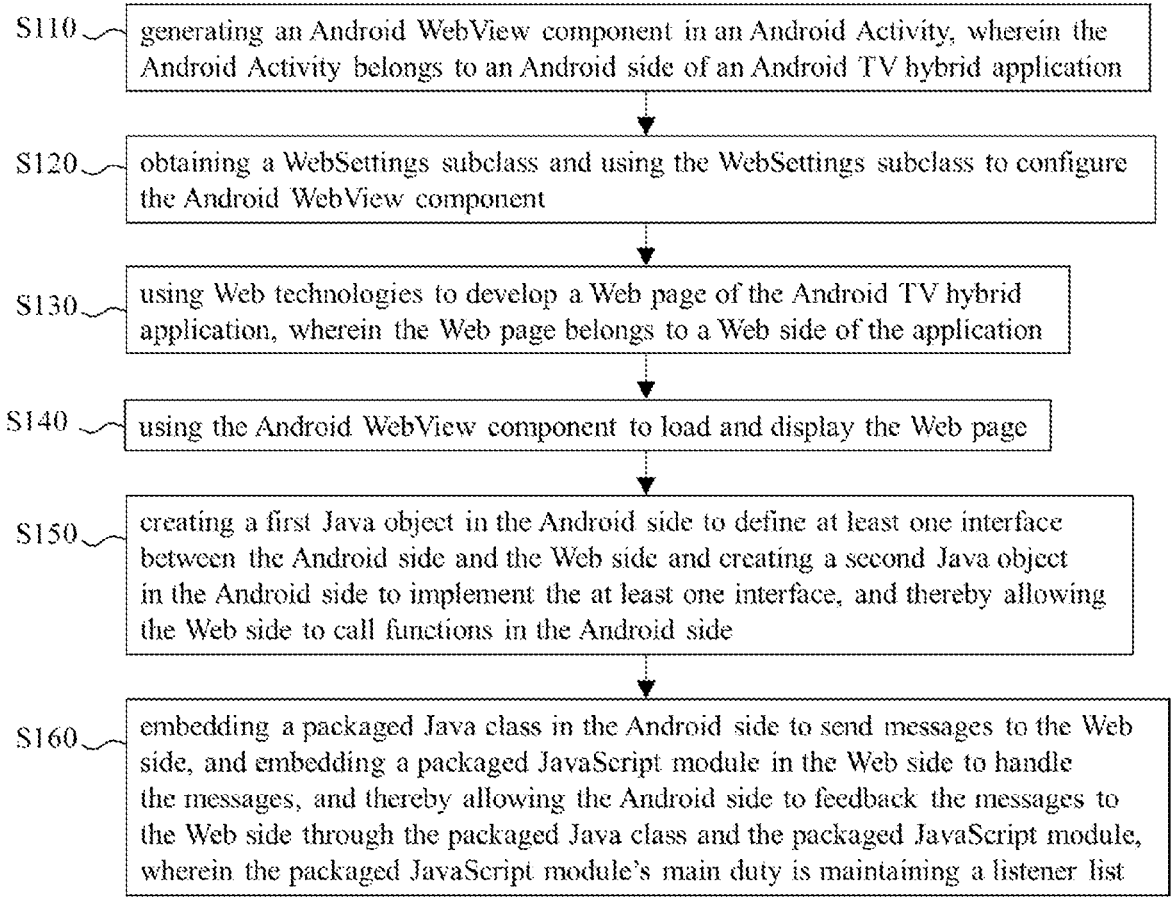
FIG. 1 shows an embodiment of the present method for developing an Android TV hybrid application.
Figure 2:
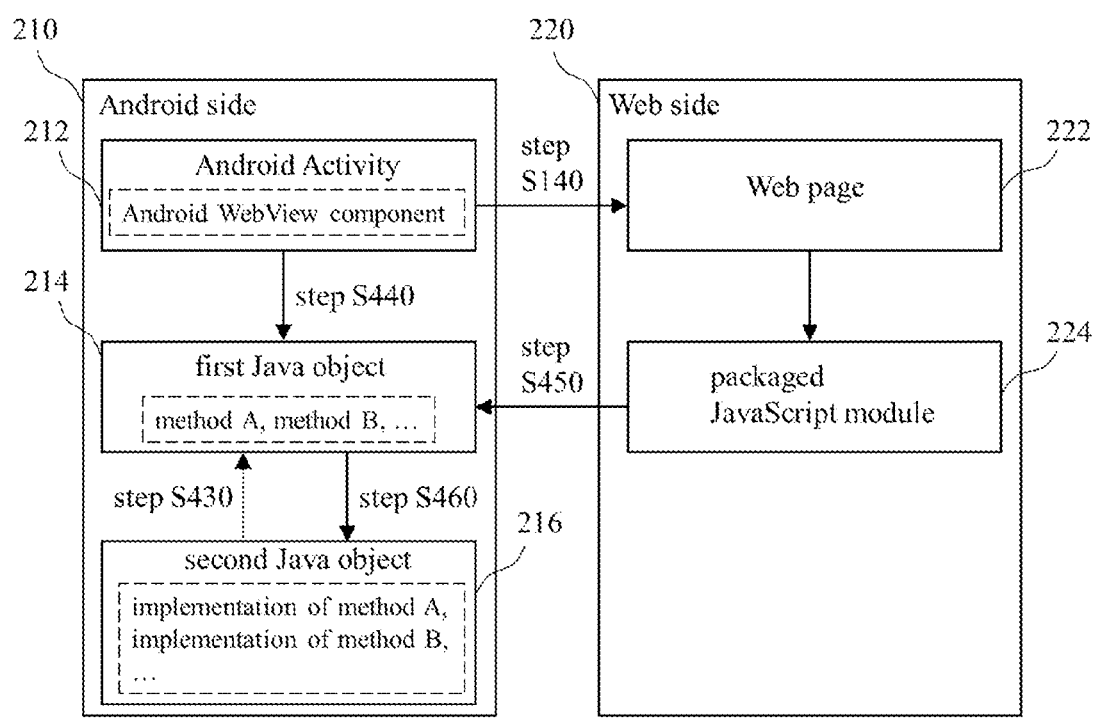
FIG. 2 shows an application framework defined by the method of FIG. 1.
Figure 3:
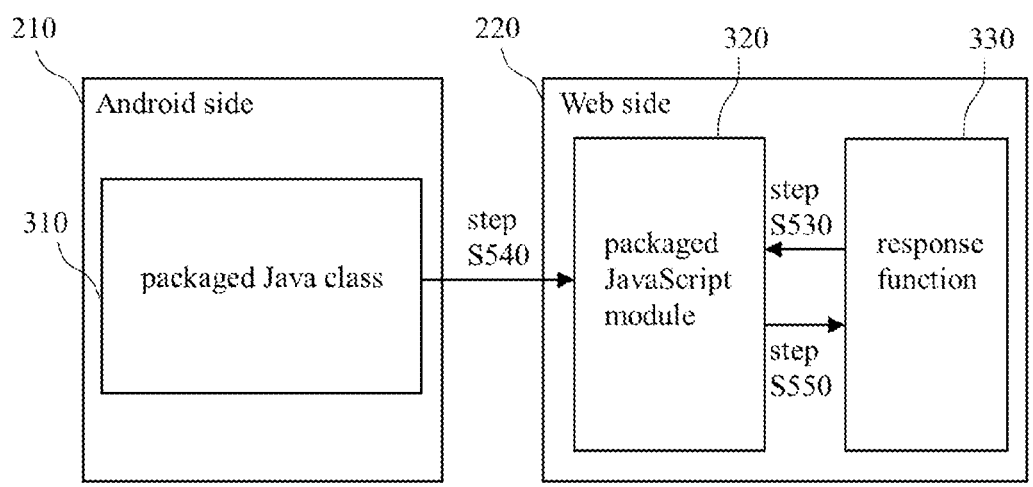
FIG. 3 shows a message feedback mechanism of the step S160 of FIG. 1.

Please refer to FIGS. 1-3. FIG. 1 shows an embodiment of the present method developing an Android TV hybrid App to be executed by an Android TV. FIG. 2 shows an application framework defined by the method embodiment of FIG. 1. FIG. 3 shows a message feedback mechanism of the step S160 of FIG. 1. In regard to the embodiment of FIG. 1, it includes the following steps:

S110: generating an Android WebView component (i.e., the Android WebView component 212 in FIG. 2) in an Android Activity, wherein the Android Activity belongs to an Android side (i.e., the Android side 210 in FIG. 2) of the Android TV hybrid application. The description and utilization of an Android Activity and an Android WebView component are known technologies and can be found in the Android Developers website (https://developer.android.com/) at present. The step S110 alone can be realized with a known/self-developed means.

S120: obtaining a WebSettings subclass and using the WebSettings subclass to configure the Android WebView component. The description and utilization of a WebSettings subclass are known technologies and can be found in the Android Developers website (https://developer.android.com/) at present. The step S120 alone can be realized with a known/self-developed means.

S130: using known/self-developed Web technologies to develop a Web page (i.e., the Web page 222 in FIG. 2) of the Android TV hybrid application, wherein the Web page belongs to a Web side (i.e., the Web side 220 in FIG. 2) of the Android TV hybrid application. The step S130 alone can be realized with a known/self-developed means.

S140: using the Android WebView component to load the Web page and display the Web page. The step S140 alone can be realized with a known/self-developed means.

S150: creating a first Java object blended with a Java context (i.e., the first Java object 214 in FIG. 2) in the Android side to define at least one interface between the Android side and the Web side and creating a second Java object (i.e., the second Java object 216 in FIG. 2) in the Android side to implement the at least one interface defined by the first Java object, and thereby allowing the Web side to call functions in the Android side through the first Java object and the second Java object. Creating a Java object can be realized with a known/self-developed means; and in this technical field an object is an instance of a class.

S160: embedding a packaged Java class (i.e., the packaged Java class 310 in FIG. 3) in the Android side to send messages to the Web side, and embedding a packaged JavaScript module (i.e., the packaged JavaScript module 224 in FIG. 2 and the packaged JavaScript module 320 in FIG. 3) in the Web side to handle the messages, and thereby allowing the Android side to feedback the messages to the Web side through the packaged Java class and the packaged JavaScript module, wherein the packaged JavaScript module's main duty is maintaining a listener list. The above-mentioned packaging can be, for example, the packaging of a class. The description and utilization of a Java class are known technologies and can be found in the Android Developers website (https://developer.android.com/) at present. The description and utilization of a JavaScript module are also known in this technical field.

Please refer to FIGS. 1-3. In regard to the step S110, in an embodiment the way to generate the Android WebView component includes one of the following: generating the Android WebView component in the Android Activity; or adding the Android WebView component to a layout file of the Android Activity.

Please refer to FIGS. 1-3. In regard to the step S120, in an embodiment the step of using the WebSettings subclass to configure the Android WebView component includes: making the Android WebView component support JavaScript, allowing the JavaScript acquired through a file Uniform Resource Locator (URL) to read a local file, and allowing the JavaScript acquired through the file URL to access other resources (e.g., resources based on Hypertext Transfer Protocol (HTTP), and resources based on Hypertext Transfer Protocol Secure (HTTPS)). The file URL technology is known in this technical field.

Please refer to FIGS. 1-3. In regard to the step S130, in an embodiment the Web technologies include at least one of the following common technologies: HyperText Markup Language (HTML); Cascading Style Sheets (CSS); and JavaScript.

Figure 4:
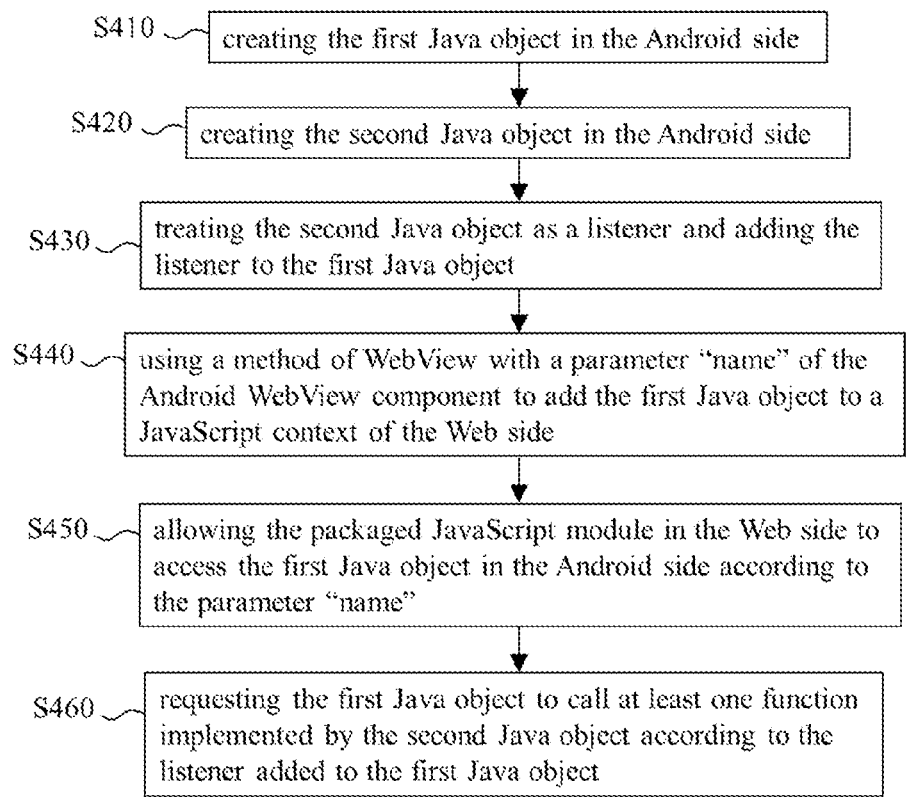
FIG. 4 shows an exemplary implementation of the step S150 of FIG. 1.

Please refer to FIGS. 1-3. In regard to the step S150, it can be understood as creating conditions for the Web side actively obtaining data for display from the Android side. FIG. 4 shows an exemplary implementation of the step S150 including the following steps:

S410: creating the first Java object (i.e., the first Java object 214 in FIG. 2) in the Android side. In this implementation, the first Java object defines a plurality of methods (i.e., method A, method B, and so on in FIG. 2).

S420: creating the second Java object (i.e., the second Java object 216 in FIG. 2) in the Android side. In this implementation, the second Java object is used for implementing the plurality of methods defined by the first Java object, which is illustrated with the dash-line block marked with "implementation of method A", "implementation of method B", and so on in FIG. 2.

S430: treating the second Java object as a listener and adding the listener to the first Java object.

S440: using a method of WebView with a parameter "name" of the Android WebView component to add the first Java object to a JavaScript context of the Web side.

S450: allowing JavaScript functions in the Web side to access the first Java object in the Android side according to the parameter "name" of the Android WebView component.

S460: requesting the first Java object to call at least one function implemented by the second Java object according to the listener added to the first Java object.

Figure 5:
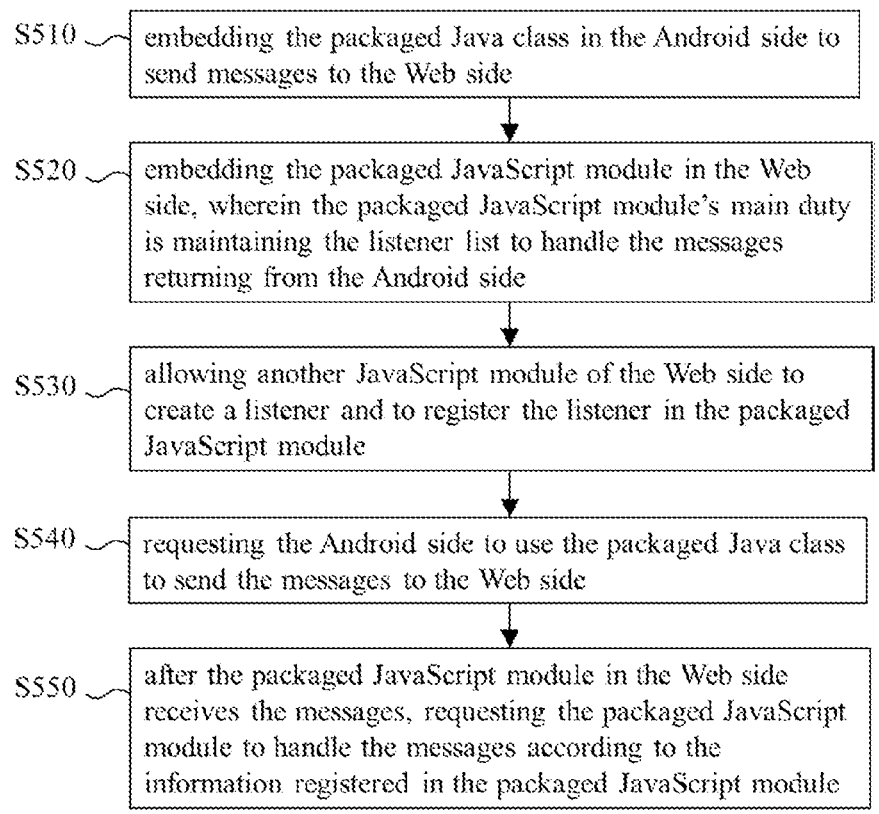
FIG. 5 shows an exemplary implementation of the step S160 of FIG. 1.

Please refer to FIGS. 1-3. In regard to the step S160, it can be understood as creating conditions for the Web side being passively notified by the Android side about whether any data/display needs to be updated. FIG. 5 shows an exemplary implementation of the step S160 including the following steps:

S510: embedding the packaged Java class (i.e., the packaged Java class 310 in FIG. 3) in the Android side to send messages to the Web side. In this implementation, different messages are distinguished by their respective event identifications (event IDs).

S520: embedding the packaged JavaScript module (i.e., the JavaScript module 224 in FIG. 2 and the JavaScript module 320 in FIG. 3) in the Web side, wherein the packaged JavaScript module's duty is maintaining the listener list to handle the messages returning from the Android side. In this implementation, the listener list is filled by other JavaScript modules, and each listener is corresponding to an event ID and thus can be recognized accordingly; and the packaged JavaScript module includes a dedicated function corresponding to the packaged Java class. The dedicated function is used for receiving the messages from the Android side; and after the dedicated function receives a message, it dispatches the message to this message's corresponding JavaScript module according to the message's event ID.

S530: allowing another JavaScript module of the Web side to create a listener and to register the listener in the packaged JavaScript module. To be specific, before the another JavaScript module registers the listener in the packaged JavaScript module, the another JavaScript module should firstly initialize the listener with an event ID, and secondly prepare a response function (i.e., the response function 330 in FIG. 3) corresponding to the event ID. The content of the response function is dependent on the demand for implementation. Other JavaScript modules in the Web side can create listeners in the above-mentioned manner.

S540: requesting the Android side to use the packaged Java class to send the messages to the Web side.

S550: after the packaged JavaScript module in the Web side receives the messages, requesting the packaged JavaScript module to handle the messages according to the information registered in the packaged JavaScript module. For example, if a received message is corresponding to the event ID of some listener, the message is assigned to the response function prepared by the JavaScript module according to the event ID, and thereby the response function is allowed to process the message.

It is noted that the present method focuses on the development flow of an Android TV hybrid App instead of the Android TV hybrid App itself; accordingly, the content of the Android TV hybrid App is dependent on its developer's demand and falls beyond the scope of the present disclosure.

It is noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly in accordance with the present disclosure.

To sum up, the present method for developing an Android TV hybrid App takes the advantages of both a native App and a Web App into consideration.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method for developing an Android television (TV) hybrid application to be performed by an Android TV, the method comprising following steps:
   generating an Android WebView component in an Android Activity, wherein the Android Activity belongs to an Android side of the Android TV hybrid application;
   obtaining a WebSettings subclass and using the WebSettings subclass to configure the Android WebView component;
   using Web technologies to develop a Web page of the Android TV hybrid application, wherein the Web page belongs to a Web side of the Android TV hybrid application;
   using the Android WebView component to load the Web page and display the Web page;
   creating a first Java object in the Android side to define at least one interface between the Android side and the Web side and creating a second Java object in the Android side to implement the at least one interface defined by the first Java object, and thereby allowing the Web side to call functions in the Android side through the first Java object and the second Java object; and
   embedding a packaged Java class in the Android side to send messages to the Web side and embedding a packaged JavaScript module in the Web side to handle the messages, and thereby allowing the Android side to feedback the messages to the Web side through the packaged Java class and the packaged JavaScript module, wherein the packaged JavaScript module's main duty is maintaining a listener list.

2. The method of claim 1, wherein the step of generating the Android WebView component includes one of the following: generating the Android WebView component in the Android Activity; or adding the Android WebView component to a layout file of the Android Activity.

3. The method of claim 1, wherein the step of using the WebSettings subclass to configure the Android WebView component includes making the Android WebView component support JavaScript, allowing the JavaScript acquired through a file Uniform Resource Locator (URL) to read a local file, and allowing the JavaScript acquired through the file URL to access other resources.

4. The method of claim 1, wherein the Web technologies include at least one of the following: HyperText Markup Language (HTML); Cascading Style Sheets (CSS); and JavaScript.

5. The method of claim 1, wherein the step of allowing the Web side to call the functions in the Android side through the first Java object and the second Java object includes:
   treating the second Java object as a listener and adding the listener to the first Java object;
   using a method of WebView with a parameter of the Android WebView component to add the first Java object to a JavaScript context of the Web side;
   allowing JavaScript functions in the Web side to access the first Java object in the Android side according to the parameter of the Android WebView component; and
   requesting the first Java object to call at least one function implemented by the second Java object according to the first Java object's listener information.

6. The method of claim 1, wherein the step of allowing the Android side to feedback the messages to the Web side through the packaged Java class and the packaged JavaScript module includes:
   allowing another JavaScript module of the Web side to create a listener and to register the listener in the packaged JavaScript module;
   allowing the Android side to use the packaged Java class to send a message to the Web side; and
   after the packaged JavaScript module in the Web side receives the messages, requesting the packaged JavaScript module to assign the message according to information registered in the packaged JavaScript module.

7. The method of claim 6, wherein the listener is created by the another JavaScript module.

8. The method of claim 6, wherein the step of allowing the Android side to feedback the messages to the Web side further includes: before the another JavaScript module registers the listener in the packaged JavaScript module, the another JavaScript module firstly initialize the listener with an event identification and secondly prepare a response function corresponding to the event identification.

9. The method of claim 8, wherein the step of requesting the packaged JavaScript module to assign the message according to the information registered in the packaged JavaScript module includes: when the message is related to the event identification, assigning the message to the response function prepared by the another JavaScript module in accordance with the event identification and thus having the response function process the messages.

\* \* \* \* \*